United States Patent [19]

Berry et al.

[11] Patent Number: 4,807,563
[45] Date of Patent: Feb. 28, 1989

[54] SELF-CONTAINED, DISPOSABLE, SANITARY TOILET FACILITY FOR PETS

[75] Inventors: Ronald L. Berry, Golden; Linda J. Scholes-Witty, Wheatridge, both of Colo.

[73] Assignee: Berry Products Corporation, Golden, Colo.

[21] Appl. No.: 73,465

[22] Filed: Jul. 15, 1987

[51] Int. Cl.⁴ ............................................. A01K 29/00
[52] U.S. Cl. ....................................... 119/1; 229/101; 229/178
[58] Field of Search .................... 119/1; 229/101, 169, 229/172, 174, 178, 195

[56] References Cited

U.S. PATENT DOCUMENTS

| | | | |
|---|---|---|---|
| 3,154,052 | 10/1964 | Sweeney | 119/1 |
| 3,258,191 | 6/1966 | Mueller et al. | 229/178 |
| 3,358,647 | 12/1967 | Wilson | 119/1 |
| 3,831,557 | 8/1974 | Elesh | 119/1 |
| 3,886,901 | 6/1975 | Zeitter | 119/1 |
| 4,452,367 | 6/1984 | Wein | 229/101 |
| 4,711,198 | 12/1987 | Mossbarger | 119/1 |

FOREIGN PATENT DOCUMENTS

2222942 3/1973 France .............................. 119/1

*Primary Examiner*—Robert P. Swiatek
*Assistant Examiner*—J. Marie Britt
*Attorney, Agent, or Firm*—Donald W. Margolis

[57] ABSTRACT

A pet litter box, including a device for locking the box after it has been used and re-closed, is formed from a single foldable blank. When the box is closed or re-closed it has inter-laying first and second halves, each having bottom and sidewall portions. The halves are connected to one another by a joining portion, and joining sidewalls. Each of the sidewalls of the first half carries a tab. The sidewall portions of the second half each define a diagonal crease, and the pair of joining side-wall portions each define a diagonal crease and a pair of vertical creases. When the box is fully open its first, second and joining portions define an open tray. After the system has been used the box can be re-closed and locked. During re-closing the joining sidewall portions and the two sidewalls of the second half all fold inwardly at their creases, thereby forming a pair of slots between the pairs of creases on each side. Then, by inserting the tabs carried by the first half sidewalls into the slots which are formed between the creases, re-closing and locking of the box is completed. The box blank may include a flap for securing the box closed before it is utilized, and a handle, and may also include all items which are necessary for pet toiletry, such as a bag of litter, and a liner sized to fit over the open tray.

22 Claims, 2 Drawing Sheets

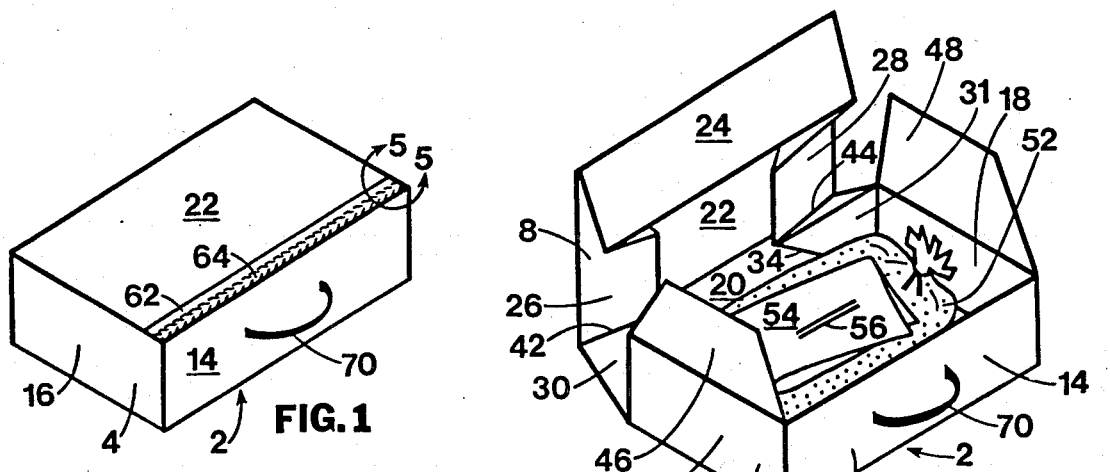
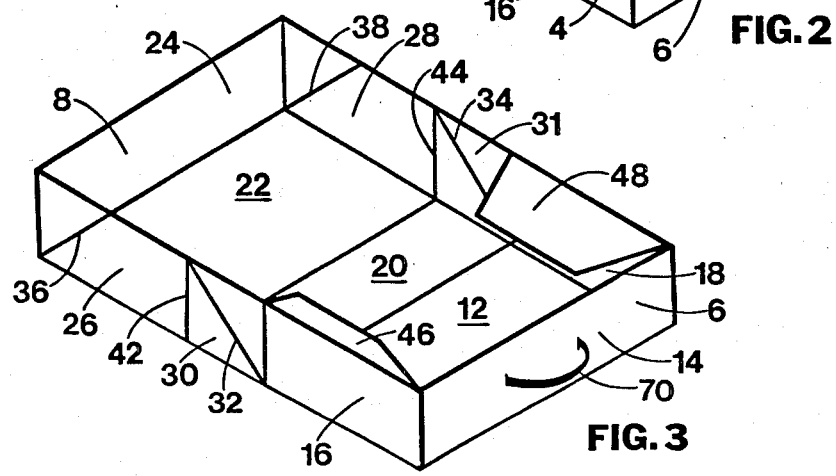
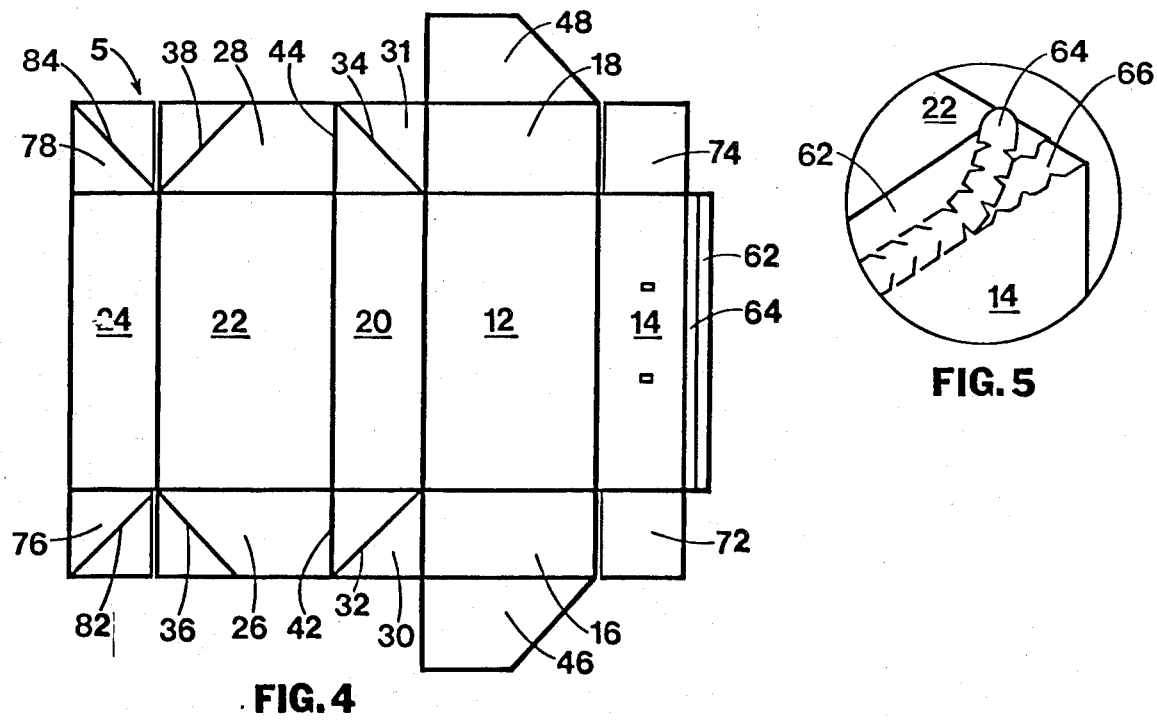

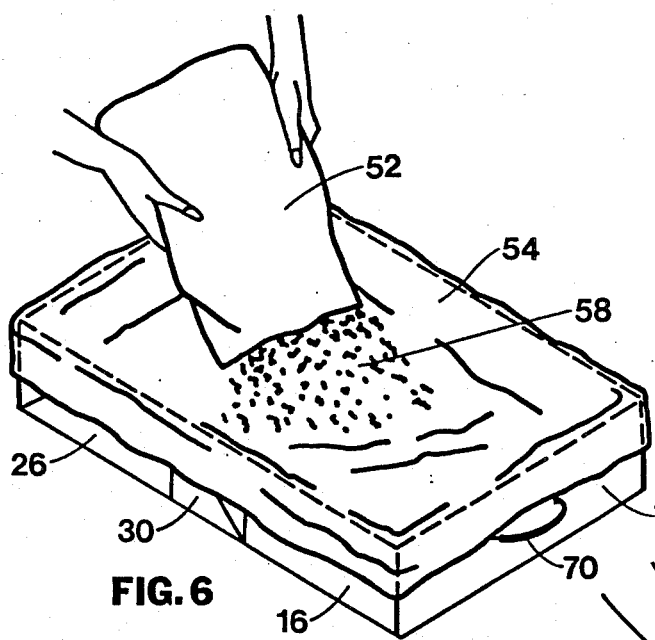
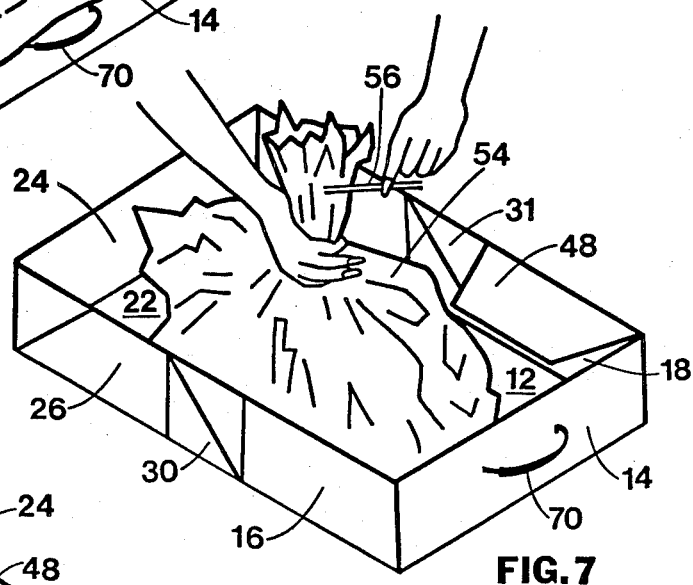
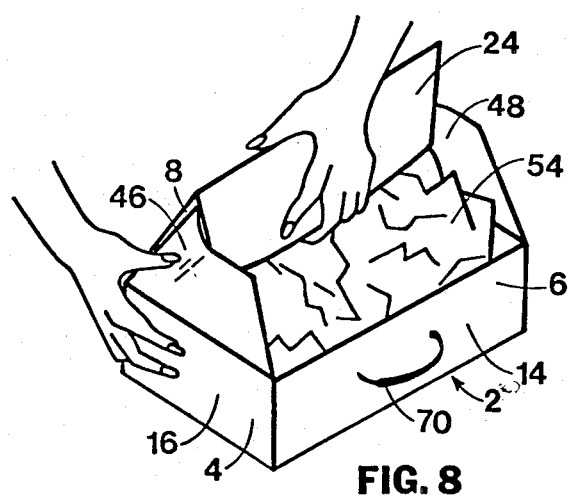
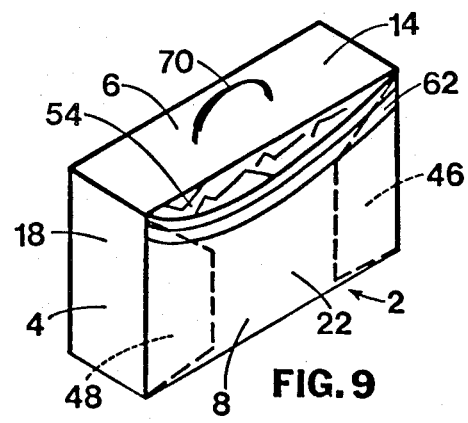

SELF-CONTAINED, DISPOSABLE, SANITARY TOILET FACILITY FOR PETS

BACKGROUND OF THE INVENTION a. Field of the Invention

The present invention relates to a self contained, disposable, sanitary toilet facility for use by pets. More specifically it relates to a self-contained toilet facility which is portable and convenient for owners of pets to set up for use by their pets, and to dispose of, either in the home or when traveling with a pet.

b. Discussion of the Prior Art

One of the most objectionable aspects of keeping a house pet such as a cat or a dog, is the maintaining of suitable toilet facilities, particularly in relatively crowded quarters such as an apartment or hotel room. Where the animal is trained to use an indoor toilet station there is the unpleasant task of keeping the station clean to prevent the development of offensive odors and/or unhealthy conditions.

Currently, most pet owners use old newspapers or a quantity of sand or ground clay in a shallow tray as a toilet station. Newspapers are particularly inefficient for such use since they have very little moisture absorbency and must be discarded almost immediately after being soiled by a pet. Sand or ground clay, generally referred to as "litter," have more permanence since they are highly absorbent materials and provide an area of earthy material which is suitable for pawing and scratching to which animals, particularly cats, are by nature attracted. However, even sand or clay must be regularly cleaned, for example, by screening, and periodically discarded and replaced by a fresh batch of litter. Sometimes cleaning or disposal of litter from an open tray is accompanied by some of the contents of the tray being accidentally spilled, for example, while the sand or clay is being transferred from the tray to a screen, or to a disposable receiver, or to a trash container. The tray which is used to contain the sand or clay usually must be cleaned by washing at regular intervals as a sanitation measure. In any event, most existing measures for keeping some sort of a permanent pet toilet station are inefficient and, at best, result in a messy and unpleasant routine.

The prior art which is perhaps the most pertinent to the present invention is Sweeney U.S. Pat. No. 3,154,052. This reference discloses a self-packaging pet toilet station comprising a carton of stiff, moisture-resistant material and constructed to fold from a fully closed box, containing a charge of litter, into an expanded open tray in which the litter may be spread over the tray bottom. The box portion is constructed from a one-piece blank and formed so as to have a mating bottom and top portion hinged to one another by a joint, which permits both free and easy opening and closing, as well as constituting portions of the upright sidewalls which define the open tray. However, the system of this prior art does not include any means which are an integral part of the box blank for securing the box closed before it is utilized, nor does it include means for re-locking the box after it has been used and re-closed. Furthermore, it neither uses nor suggests the use of a disposable liner for the litter, nor does it provide or suggest the use of a handle to be used in carrying the box.

In other prior art, Smith U.S. Pat. No. 3,684,155 discloses a package receptacle of the book-fold type containing a disposable waterproof liner for the receptacle. When open the package receptacle provides a sanitary container tray useful as a pet animal toilet station. The receptacle includes means to securely hold the liner in place when the opened package is lined with the disposable liner. However, the container of this reference cannot be folded to form a box to hold litter, either before or after it is used. Furthermore, it does not include a handle for ease of carrying the receptacle. Coughlin, et al. U.S. Pat. No. 4,014,292 discloses a sanitary pet litter container comprised of a carton which can be folded into a wedge-shaped configuration for storage or disposal, or which may be opened to receive pets. The container does include a waterproof lining or coating and provides litter packaged within it. The container is constructed in such a manner that the opposed sidewalls may be folded into one another, in a flap and slot manner, to secure the container closed both before and after its use. When opened, the container requires the use of channels to brace the sidewalls open. This system provides no handle or other similar means for ease of carrying. Edgar U.S. Pat. No. 4,164,314 discloses a single use disposable package formed from a paper board blank into a six-sided box for containing cat litter. When the package is used the top section of the box is held rigidly in its open position, by the engagement of slots and tabs. The system provides no means for re-closing the box after its use, nor for the provision of a handle or other carrying means for carrying the container.

The patent to Wellman, et al. U.S. Pat. No. 4,271,787, discloses a plurality of self-contained and pre-loaded feline litter boxes housed in stacked relation within a container having external walls. The litter boxes contain no liner, include no carrying handle, and do not have an integral means for re-locking the boxes after they have been used. Noonan U.S. Pat. No. 4,305,544 discloses a disposable cat litter box which is formed of waterproof paper board. This reference details means for constructing such a box out of paper board. However, the resulting box has no means integral with its structure for securing the box in a locked or closed position either before or after its use, nor the provision of a handle or similar carrying means to provide ease of carrying. Bienvenu, et al. U.S. Pat. No. 4,501,226 also discloses a disposable pet litter container constructed from a paper board blank. The container is integral, made from folded material, and is coated with moisture impervious material. As with the previous patent, it includes no means integral with the paper board blank for closing or locking the container either before or after its use, nor the provision of a handle or similar means for ease in carrying the system. Higgins, et al. U.S. Pat. No. 4,541,360 discloses a disposable animal litter box having a removable fluid tight bottom and a cover member which includes a selectively removable portion to define an opening into the container. Once opened, the container provides no integral means for re-closing or locking the container, nor does it provide a handle for ease of handling and carrying. Feitelson U.S. Pat. No. 4,548,160 discloses a sealed disposable cat litter box formed from a paperboard blank. Litter is contained within the sealed box when it is obtained by the user. In use, the top is unsealed and folded and secured out of the way to form additional sidewall portions. After use, and to dispose of the litter and box, the top portion which had been folded and secured out of the way is unfolded and repositioned horizontally to reform a top closure means for the box. The top is then sealed with tape, and the box containing the litter is disposed of. However, this reference does not disclose a means for resealing the box which is integral with the box, nor does it disclose the use of a handle. Finally, and most recently, Cheesman U.S. Pat. No. 4,553,671 discloses a disposable cat litter container having the litter material packaged in the container. The container has a rectangularly shaped top wall having a central perforated tear-out portion. It is formed from a single integral piece of paper-board material. However, the bottom of the container is formed from a separate moisture resistant sheet. Nothing within this patent provides means integral with the container for resealing after use, nor for the provision or use of a handle.

SUMMARY OF THE INVENTION

Accordingly, it is an object of the present invention to provide improvements in toilet stations for house pets and the like.

Still another object of this invention is to provide a pet toilet station which may be conveniently stored or carried, is easily set up, and, yet is neatly and completely disposable.

Another object of this invention is to provide a completely self contained pet sanitary station, including a supply of litter and a disposable liner for the litter.

Yet another object of this invention is to provide a pet toilet station system in the form of a box which is formed from a single foldable blank which includes means which are an integral part of the box blank, for securing the box closed before it is utilized, means which are an integral part of the box blank for re-locking the box after it has been used and re-closed, and the use of a handle in carrying the box.

The present invention provides a combined portable, disposable sanitary toilet facility in the form of a system for use by household pets, both at home and away from home. The container system of the present invention combines in a single package, all of the items which are normally necessary for pet animal toiletry. The combined system includes a receptacle which is formed from a single foldable blank. The combined system is initially in the form of an openable one piece box composed of a first and a second half, each half having an endwall and a pair of sidewalls, the halves being connected by a connecting portion and by a pair of connecting sidewall portions between the sidewalls of the first and second halves. The pair of connecting sidewall portions between the first and second halves, and the sidewalls of the second half each carry a single diagonal crease and a pair of vertical creases which allows the second half to be collapsed and folded inwardly to nest or inter-lay in the first half. Integral with each of the sidewalls of the first half is a tab. When the box is unused and closed, it is secured in its closed position by a flap which is formed as an integral part of the single foldable blank, and having, for example, an adhesive strip for securing it and a tear strip. To open such a box, the tear strip is grasped at one end and torn from the flap. This breaks the connection of the closing flap so that the first half of the box can be separated from the second half. In preferred embodiments, the box includes a bag of litter, a disposable liner to be placed in the box to receive the litter after the box is opened to form a tray, and means, such as a wire tie strip, to secure the liner closed when the litter is to be disposed of.

When the combined system of the present invention is put into use as a portable, disposable sanitary toilet facility for household pets, the tear strip is grasped at one end and torn from the flap, the box is opened, the bag of litter, the liner, and the wire tie strip are removed from the box. Then the box is opened and laid completely flat on the ground, to provide a tray. The disposable liner is then opened and is secured within the tray to form a liner for the tray. The liner is waterproof and is designed and sized to fit within the open container of the tray, and is fit within the open container of the tray, resting on and covering the bottom; then directed upwards along and within the interior endwalls, sidewalls, and common connecting sidewall portions; and then is subsequently folded over the top edges of the end and side walls so that a portion of it fits relatively snugly around the exterior walls of the tray. Then the bag of litter is opened and the litter is spread evenly over the interior of the bottom the disposable liner in the bottom of the tray, thereby providing a ready-for-use animal toilet station.

After the system has been used by a pet for a period of time, and/or the litter enclosed in the disposable liner is considered to be spent, the opening process is substantially reversed. The liner containing the soiled spent litter is disengaged from the top of the tray formed by the box, gathered at its top, and secured closed, for example using a wire tie strip to close it. Then, while the tray is still open, the secured and closed disposable liner is fitted substantially only into the first half portion of the box. The second half portion of the box is then folded within the first half which contains the closed and secured disposable liner containing spent litter, to re-close the box. However, the tabs carried by the sidewalls of the first half are now bent outwardly so that they are initially external to the box as it is being re-closed. As the inter-laying of the second half within the first half approaches completion, the connecting sidewall portions and the two sidewalls of the second half all fold inwardly at their inwardly folding creases, thus allowing the second half to fold inwardly and inter-lay on top of the first half. This folding action also causes a pair of slots to be formed between certain pairs of creases in each side of the second half. Then, the tabs carried by each sidewall of the first half are inserted into the slots formed between the creases, and closure of the box is completed. Thus, the tabs carried by the sidewalls are used to hold the first half and the second half together, and secure the box in a substantially closed and secured position, ready for disposal.

In preferred embodiments the rectilinear box includes a carrying handle integral with and carried by the structure of the endwall of the first half. This allows the closed and secured box to be easily lifted by the handle, carried to and placed in a suitable trash container.

For a fuller understanding of the nature and objects of the present invention, reference should be made to the following detailed description taken in conjunction with the accompanying drawings.

BRIEF DESCRIPTION OF THE DRAWINGS

The accompanying drawings illustrate complete preferred embodiments of the present invention according to the best modes presently conceived for the practical application of the principles thereof, and in which:

FIG. 1 is a perspective view of the portable, disposable sanitary toilet facility combined system of the present invention in its fully closed position before it has been opened, and setup for use;

FIG. 2 is a perspective view of the portable, disposable sanitary toilet facility with re-closable tabs, of FIG. 1 partially opened to show some of the details of the interior of the receptacle, including a disposable liner bag, a container of litter, and a wire closing strip, all of which will be present in preferred embodiments of the present invention;

FIG. 3 is a perspective view of the receptacle of the combined system of the present invention fully opened to form a tray, but prior to the insertion of a disposable liner bag and litter;

FIG. 4 is a top plan view of the integral box blank which is used to form the receptacle of the present invention;

FIG. 5 is an enlarged view, taken at inset 5—5 of FIG. 1, but with the tear strip lifted, showing details of the pull tab opening system of the container;

FIG. 6 is similar to FIG. 3, but shows the disposable liner bag inserted in place in the open receptacle tray, shown partially in phantom, with litter being spread in the liner from a litter container;

FIG. 7 is similar to FIG. 6, but shows the disposable liner bag being closed and sealed with a wire tie strip, after the litter in the system has been soiled;

FIG. 8 is similar to FIG. 2, but shows the sealed, disposable liner bag containing used litter after it has been placed in one half of the receptacle and with the receptacle being closed by use of the reclosable tabs; and FIG. 9 illustrates, but rotated horizontally 180° and vertically 90° from that shown in FIG. 8, the general appearance of the combined system of the present invention after the sealed disposable liner bag containing soiled litter has been placed in it and the receptacle has been sealed closed.

DETAILED DESCRIPTION OF THE INVENTION

Referring now to the drawings, the combined system of the present invention, generally 2, includes, in a single package, all items which are normally necessary for pet animal toiletry. The combined system 2 includes a receptacle which is initially in the form of an openable one piece box 4 made, for example, from a single integral foldable blank 5, shown in FIG. 4, formed for example, from ordinary craftboard.

Box 4 is composed of a first half 6 and a second half 8. First half 6 has a substantially rectilinear, four edged bottom portion 12; a rectilinear, four edged endwall 14; and two opposed, rectilinear, sidewalls 16 and 18, each having four edges. Sidewalls 16 and 18, bracket and are substantially connected to endwall 14 when the box is formed from blank 5. The two opposed sidewalls 16 and 18 and the endwall 14, shown in FIG. 4 substantially continuously circumscribe three contiguous edges of bottom portion 12.

Another rectilinear, four edged panel hereinafter, "connecting panel" 20, is connected to and has one edge in substantial registration with the forth edge of bottom portion 12, and forms a crease thereat. How-ever, connecting panel 20 is not directly connected to either of the two opposed sidewalls 16 and 18.

Second half 8 of box 4 also includes a substantially rectilinear, four edged bottom portion 22; a rectilinear, four edged endwall 24; and two opposed, rectilinear, sidewalls 26 and 28, each having four edges. Sidewalls 26 and 28 bracket and are substantially connected to endwall 24 when the box is formed from blank 5. The two opposed sidewalls 26 and 28 and the endwall 24 of second half 8 substantially continuously circumscribe three contiguous edges of bottom portion 22 of second half 8.

The connecting panel 20, which is connected to the fourth edge of bottom portion 12 of first half 6, is also connected to and in substantial registration with the fourth edge of bottom portion 22 of second half 8, without being directly connected to either of the two opposed sidewalls 26 and 28 of second half 8. The connection of connecting panel 20 to the bottom of the second half 8 is at an edge of the connecting panel which is opposed to the connection of connecting panel 20 to first half 6, and forms a crease thereat. It will thus be noted that connecting panel 20 connects together bottom portion 12 and 22 of first half, 6 and second half 8, respectively, of box 4.

In the embodiment shown, a pair of opposed connecting sidewall portions 30 and 31 are substantially continuously connected to the two opposed edges of the connecting panel which are not connected to bottom portion 12 of first half 6 or to bottom portion 22 of second half 8. As illustrated, this pair of connecting sidewalls 30 and 31 also connect to and are connected with the adjacent sidewall edge portions 16 and 26, and 18 and 28, respectively, and form creases therewith. The pair of connecting sidewall portions 30 and 31 each carry a diagonal crease 32 and 34, respectively, which allows them to be inwardly foldable. In a similar manner, the two sidewalls 26 and 28 of the second half also each carry a crease or perforation 36 and 38, respectively, which allows them to be inwardly foldable. Inwardly foldable, vertical creases 42 and 44 are formed between connecting sidewall portions 30 and 31 and the two sidewalls 26 and 28 of the second half. Creases may be formed by folding, perforating, scoring or the like. In preferred embodiments diagonal creases 32 and 34 and diagonal creases 36 and 38 are at a 45° angle and are slanted towards one another. Integral with sidewalls 16 and 18, and discussed in greater detail below, are tabs 46 and 48, respectively.

As shown in detail in FIG. 1, and in greater detail in FIG. 5, on the top of endwall 14 is a flap 62 including a tear strip 64. Flap 62, or the portion of bottom portion 22 which is overlapped by flap 62, is provided with a connecting mechanism, such as adhesive 66 or an adhesive strip or other connecting means, not shown, for use in connecting flap 62 to the outer surface of bottom portion 22. Thus, when the box is unused and closed, as shown in FIG. 1, it is secured in its closed position by flap 62.

Thus, in the configuration shown in FIGS. 1 and 9, the box would appear from the outside to consist of the first bottom portion 12 and the second bottom portion 22 in substantially opposed parallel relation to one another, the two bottom portions 12 and 22 appearing to be circumscribed by endwall 14 and sidewalls 16 and 18 of first half 6, and joining panel 20.

As best shown by FIG. 2, the pair of connecting sidewall portions 30 and 31, the two sidewalls 26 and 28 of second half 8, fold inwardly at creases 32 and 34, and 36 and 38, and 42 and 44, respectively, thus allowing endwall 24 and sidewalls 26 and 28, and the pair of connecting sidewall portions 30 and 31 to all fold inwardly and nest within endwall 14 and sidewalls 16 and 18 of first half 6.

Now, to open box 4, tear strip 64 is grasped at one end and torn from flap 62. This breaks the connection of flap 62 with bottom portion 22 so that first half 6 can be separated from second half 8, as shown in FIG. 2. In preferred embodiments box 4 will carry within it a bag 52 or other container of litter 58, a disposable waterproof liner 54, and means to secure liner 54, such as wire tie strip 56.

Now, when the system of the present invention is put into use as a portable, disposable sanitary toilet facility for household pets, bag 52, liner 54, and strip 56 are first removed from box 4. Then box 4 is opened completely and laid flat upon the ground to provide a tray, as shown in FIGS. 3, 6 and 7. The tray thus formed has a bottom consisting of the substantially coplanar first bottom portion 12, the connecting portion 20, and the second bottom portion 22, and which bottom is circumscribed by the endwall 14 and sidewalls 16 and 18 of first half 6, endwall 24 and sidewalls 26 and 28 of second half 8, and the pair of common connecting sidewall portions 30 and 31, but not in that order.

Now referring to FIG. 6, liner 54 is shown opened and secured within the tray. Disposable liner 54 is designed and sized to fit within the open container of the tray, resting on and covering the bottom; then directed upwards along and within the interior endwalls, sidewalls, and common connecting sidewall portions; and then is subsequently folded over the top edges of its end and sidewalls so that a portion of it fits relatively snugly around the exterior walls of the tray. Then bag 52 is opened and litter 58 is spread evenly over the interior of the bottom disposable liner 54 in the bottom of the tray, thereby providing a ready-for-use animal toilet station.

After the system has been used by a pet for a period of time, and the litter 58 supported by disposable liner 54 is considered to be spent, the opening process is substantially reversed. In this closing process, and referring to FIG. 7, liner 54 containing spent litter 58 is first disengaged from the top of the tray formed from box 4, then gathered closed at its top, and secured closed, for example, with wire tie strip 56, or by other closure means. Then, while the tray is still substantially open, closed disposable liner 54 is fitted substantially only into first half 6. Then, referring to FIG. 8, second half 8 is folded within first half 6 to re-close box 4. Tabs 46 and 48 are now bent out so that they are initially external to box 4 as it is being re-closed. As the inter-laying of second half 8 within first half 6 approaches completion, connecting sidewall portions 30 and 31 and the two sidewalls 26 and 28 all fold inwardly at creases 32 and 34, creases 36 and 38, and creases 42 and 44, respectively, thus allowing endwall 24 and sidewalls 26 and 28, and the pair of connecting sidewall portions 30 and 31 to all fold inwardly and nest within endwall 14 and sidewalls 16 and 18 of first half 6. This folding action also causes a pair of slots to be formed in each side of second half 8, a first slot between creases 36 and 42 and a second slot between creases 38 and 44. Then, tabs 46 and 48, respectivley, are inserted into the slots formed between creases 36 and 42, and between creases 38 and 44, respectively, and closure of box 4 is completed. It will thus be seen that tabs 46 and 48 carried by sidewalls 16 and 18 are used in this instance to hold first half 6 and second half 8 together, and secure box 4 in its substantially closed position, ready for disposal, as shown in FIG. 9.

In preferred embodiments the rectilinear box 4 includes a carrying handle 70 integral with and carried by the structure of the first endwall 14. This allows the closed and sealed box 4 to be easily lifted by the handle and carried, for example, to be placed in a suitable trash container.

Additional details of the structure of box blank 5 are shown in FIG. 4. A series of small tabs 72 and 74, and 76 and 78 are integral with and extend from endwalls 14 and 24, respectively. These tabs provide the necessary overlap between the adjacent sidewalls and endwalls to allow connecting of the same, for example by the use of adhesive or mechanical connectors when box 4 is formed from blank 5. It will be noted that tabs 76 and 78 will overlap with sidewalls 26 and 28, respectively, and therefore those tabs include creases 82 and 84, respectively, to coincide with creases 36 and 38.

It is thus seen that the present invention provides a portable, disposable sanitary toilet facility in the form of a self contained system which is a particularly neat and useful item which eliminates substantially all handling of litter material, since the material is supplied with the system. The system is self packaging and can be provided at a very low cost. Since both the litter material and box are purchased as a unit and discarded as a unit there is no need for maintaining a supply of litter material or for employing a separate tray of any sort. The device will be found to be especially useful when travelling with a pet.

While the invention has been particularly shown and described with reference to preferred embodiments thereof, it will be understood by those skilled in the art that the foregoing and other modifications or changes in form and detail ma be made therein without departing from the spirit and scope of the invention as claimed, except as precluded by the prior art.

What is claimed is:

1. In a combined disposable box and sanitary station tray for pets, wherein said combination is formed from a single sheet of foldable material, said disposable box having a first half and a second half, each half having a bottom portion, an endwall and, a pair of sidewall portions bracketing its said respective endwall, and a connecting portion having a connecting bottom portion and pair of connecting sidewall portions there-inbetween said first half land said second half, there being creases to facilitate folding between said connecting bottom portion and said pair of connecting sidewall portions and each said adjacent bottom portion and each said adjacent sidewall portion of said first and second halves, respectively; said box initially defining a closed container with said sidewall portions and said endwall of said second half inter-laid within said sidewall portions and said endwall of said first half when said first and second halves are folded together to form a box; and forming a flat open sanitary station tray for pets with continuous surrounding upright side walls and end walls when said first and second halves of said box are folded open with their respective bottom portions and said connecting bottom portion in substantially co-planar relationship to one another, wherein the improvement comprises:

each of said sidewalls of said first half having a tab extending from it, said tab for use in securing and locking said box;

each of said connecting sidewall portions having a single inwardly folding diagonal crease extending from its top edge to its bottom edge and a pair of vertical creases extending from its top edge to its bottom edge, each said vertical crease being adjacent to one of said sidewalls of said first half or said second half, said vertical crease which is adjacent to said first half being outwardly folding, and said vertical crease which is adjacent to said second half being inwardly folding; and each of said sidewall portions of said second half having an inwardly folding diagonal crease extending from its top edge to its bottom edge; whereby after said box is opened to form a tray, and then re-closed to form a box with said second half inter-laying within said first half, said connecting sidewall portions and said two sidewalls of said second half all fold inwardly at their said respective inwardly folding diagonal creases and inwardly folding vertical creases to allow such inter-laying; nesting; and whereby further, a pair of slots is simultaneously formed on each side between each said inwardly folding diagonal sidewall crease of said second half and each said inwardly folding vertical crease between said second half sidewall and said connecting sidewall portion, thus allowing said tabs carried by said first half sidewalls to be inserted into said slots so formed between said creases and said second half sidewalls to thereby secure said tabs and lock said box closed, whereby said box is then ready for disposal or carrying.

2. The combined disposable box and sanitary station of claim 1, wherein said diagonal creases carried by each of said connecting sidewall portions are slanted towards said diagonal creases carried by said sidewall portions of said second half, and wherein further said diagonal creases carried by said sidewall portions of said second half are slanted towards said diagonal creases carried by said connecting sidewall portions.

3. The combined disposable box and sanitary station of claim 2, wherein said diagonal creases carried by each of said connecting sidewall portions are slanted towards said diagonal creases carried by said sidewall portion of said second half at about a 45° angle.

4. The combined disposable box and sanitary station of claim 2, wherein said diagonal creases carried by said sidewall portions of said second half are slanted towards said diagonal creases carried by said connecting sidewall portions at about a 45° angle.

5. The combined disposable box and sanitary station of claim 3, wherein said diagonal creases carried by said sidewall portions of said second half are slanted towards said diagonal creases carried by said connecting sidewall portions at about a 45° angle.

6. The combined disposable box and sanitary station of claim 5, wherein each said tab has a pair of side edges, one side edge of each said tab being tapered at an angle of about 45° and therefore have a tapered variable width dimension, and wherein further the distance between said creases on each side which form said slot is tapered on one side at an angle of about 45° and said slot has a width which is continuously variable and slightly greater than the width of said tab when it is fully inserted in said slot.

7. The combined disposable box and sanitary station of claim 6, wherein each said sidewall of said first half has a top edge and a bottom edge, and wherein said tabs are connected to said top edges of said sidewalls.

8. The combined diposable box and sanitary station of claim 1, wherein said tabs have a width dimension and wherein the distance between said creases on each side which form each slot are slightly greater than the width of said tab when it is fully inserted in said slot.

9. The combined disposable box and sanitary station of claim 1, wherein each said sidewall of said first half has a top edge and a bottom edge, and wherein said tabs are connected to said top edges of said sidewalls.

10. The combined disposable box and sanitary station of claim 1, wherein, during the re-closing of said tray to form a box, said tabs are initially bent up and out of said box to allow said tabs to be inserting into said slots.

11. The combined disposable box and sanitary station of claim 1, wherein a quantity of litter material is packaged within said box, which litter is intended to be spread over said tray when said box is in its open position to form a tray.

12. The combined disposable box and sanitary station of claim 11, wherein a liner sized to fit within said open tray when said box is in its open position to form a tray is packaged within said box, and wherein further said litter material is packaged within a separate container.

13. The combined disposable box and sanitary station of claim 1, wherein a liner sized to fit within said open tray when said box is in its open position to form a tray is packaged within said box.

14. The combined disposable box and sanitary station of claim 1, wherein a carrying handle is present on said box.

15. The combined disposable box and sanitary station of claim 14, wherein said carrying handle is present and centered on said endwall of said first half.

16. The combined disposable box and sanitary station of claim 1, wherein said single sheet of foldable material includes integral therewith a flap, said flap being so located as to provide means for initially locking said box in a closed position at the time that said box is first formed.

17. The combined disposable box and sanitary station of claim 16, wherein said endwall of said first half has a bottom edge adjacent said bottom portion of said first half, and a top edge, and wherein said flap is extended from said top edge of said endwall of said first half.

18. The combined disposable box and sanitary station of claim 17, wherein said bottom portion of said second half has an inside surface and an outside surface, and wherein said flap is connected to said outside surface of said bottom portion of said second half in order to initially hold said box in a closed position at the time that said box is first formed.

19. The combined disposable box and sanitary station of claim 18, wherein said flap is connected to said bottom portion of said second half by the use of an adhesive in order to initially hold said box in a closed position at the time that said box is first formed.

20. The combined disposable box and sanitary station of claim 19, wherein said flap contains a tear strip for disconnecting said bottom portion of said second half from said first half in order to allow said box to be opened.

21. In a combined disposable box and sanitary station tray for pets, wherein said combination is formed from a single sheet of foldable material, said disposable box having a first half and a second half, each half having a bottom portion, an endwall and, a pair of sidewall portions bracketing its said respective endwall, wherein each said sidewall has a top edge and a bottom edge, wherein further each said endwall has a top edge and a bottom edge, and wherein further each said bottom portion has an inside surface and an outside surface, and also having a connecting portion having a connecting bottom portion and pair of connecting sidewall portions thereinbetween said first half and said second half, there being creases to facilitate folding between said connecting bottom portion and said pair of connecting sidewall portions and each said adjacent bottom portion and each said adjacent sidewall portion of said first and second halves, respectively; said box initially defining a closed container with said sidewall portions and said endwall of said second half nested within said sidewall portions and said endwall of said first half when said first and second halves are folded together to form a box; and forming a flat open sanitary station tray for pets with continuous surrounding upright side walls and end walls when said first and second halves of said box are folded open with their respective bottom portions and said connecting bottom portion in substantially coplanar relationship to one another, wherein the improvement comprises:

- a quantity of litter material packaged within a separate container is within said box, and wherein further a liner sized to fit within said open tray when said box is in its open position to form a tray is packaged within said box, whereby said liner is intended to be removed from said box and opened and fit within said tray, and said litter is intended to be removed from its container and then spread over said liner in said tray when said box is in its open position to form a tray;
- a carrying handle, said carrying handle being centered on said endwall of said first half;
- each of said sidewalls of said first half having a tab extending from and connected to said top edges of said sidewalls, said tabs having a pair of edges, one edge of each said tab being tapered at an angle of about 45°, said tab therefore having a tapered variable width dimension;
- each of said connecting sidewall portions having a single inwardly folding diagonal crease extending from its top edge to its bottom edge at about a 45° angle and a pair of vertical creases extending from its top edge to its bottom edge, each said vertical crease being adjacent to one of said sidewalls of said first half or said second half, said vertical crease which is adjacent to said first half being outwardly folding, and said vertical crease which is adjacent to said second half being inwardly folding; and each of said sidewall portions of said second half having an inwardly folding diagonal crease extending from its top edge to its bottom edge at about a 45° angle, and wherein said diagonal creases carried by each of said connecting sidewall portions are slanted towards said diagonal creases carried by said sidewall portions of said second half, and wherein further said diagonal creases carried by said sidewall portions of said second half are slanted towards said diagonal creases carried by said connecting sidewall portions;
- said single sheet of foldable material including integral therewith a flap, said flap extending from said top edge of said first endwall so as to provide means for initially locking said box in a closed position by the use of an adhesive material to connect said flap to said outside surface of said bottom portion of said second half at the time that said box is first formed, and wherein said flap also includes a tear strip for disconnecting said bottom portion of said second half from said first half in order to allow said box to be opened; whereby said flap is connected to said outside surface of said bottom portion of said second half in order to initially hold said box in a closed position at the time that said box is first formed, and after said tear strip is removed and the box is opened to form a tray, and then re-closed to form a box with said second half nesting within said first half, said connecting side-wall portions and said two sidewalls of said second half all fold inwardly at their said respective inwardly folding diagonal creases and inwardly folding vertical creases to allow such nesting; and wherein further a pair of slots is simultaneously formed, one on each side between each said inwardly folding diagonal sidewall crease of said second half and each said inwardly folding vertical crease between said second half sidewall and said connecting sidewall portion, wherein the distance between said creases on each side which form said slot are slightly greater than the width of said tabs, thus allowing said tabs carried by said first half sidewalls to be inserted into said slots so formed between said creases to thereby secure said tabs and hold said box closed, whereby said box is then ready for disposal.

22. In a combined box and tray, wherein said combination is formed from a single sheet of foldable material, said box having a first half and a second half, each half having a bottom portion, an endwall and, a pair of sidewall portions bracketing its said respective endwall, and a connecting portion having a connecting bottom portion and pair of connecting sidewall portions thereinbetween said first half and said second half, there being creases to facilitate folding between said connecting bottom portion and said pair of connecting sidewall portions and each said adjacent bottom portion and each said adjacent sidewall portion of said first and second halves, respectively; said box initially defining a closed container with said sidewall portions and said endwall of said second half nested within said sidewall portions and said endwall of said first half when said first and second halves are folded together to form a box; and forming a flat open tray with continuous surrounding upright side walls and end walls when said first and second halves of said box are folded open with their respective bottom portions and said connecting bottom portion in substantially coplanar relationship to one another, wherein the improvement comprises:

- each of said sidewalls of said first half having a tab extending from it;
- each of said connecting sidewall portions having a single inwardly folding diagonal crease extending from its top edge to its bottom edge and a pair of vertical creases extending from its top edge to its bottom edge, each said vertical crease being adjacent to one of said sidewalls of said first half or said second half, said vertical crease which is adjacent to said first half being outwardly folding, and said vertical crease which is adjacent to said second half being inwardly folding; and
- each of said sidewall portions of said second half having an inwardly folding diagonal crease extending from its top edge to its bottom edge; whereby after said box is opened to form a tray, and then re-closed to form a box with said second half nesting within said first half, said connecting sidewall portions and said two sidewalls of said second half all fold inwardly at their said respective inwardly folding diagonal creases and inwardly folding vertical creases to allow such nesting; and wherein further a pair of slots is simultaneously formed on each side between each said inwardly folding diagonal sidewall crease of said second half and each said inwardly folding vertical crease between said second half sidewall and said connecting sidewall portion, thus allowing said tabs carried by said first half sidewalls to be inserted into said slots so formed between said creases to thereby secure said tabs and hold said box closed.

* * * * *